(12) United States Patent
Hazeyama et al.

(10) Patent No.: US 9,825,495 B2
(45) Date of Patent: Nov. 21, 2017

(54) ROTATING ELECTRIC MACHINE

(71) Applicant: MITSUBISHI ELECTRIC CORPORATION, Chiyoda-ku (JP)

(72) Inventors: Moriyuki Hazeyama, Chiyoda-ku (JP); Akihiro Daikoku, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 161 days.

(21) Appl. No.: 14/895,776

(22) PCT Filed: May 15, 2014

(86) PCT No.: PCT/JP2014/062926
§ 371 (c)(1),
(2) Date: Dec. 3, 2015

(87) PCT Pub. No.: WO2014/199769
PCT Pub. Date: Dec. 18, 2014

(65) Prior Publication Data
US 2016/0126791 A1    May 5, 2016

(30) Foreign Application Priority Data

Jun. 10, 2013  (JP) ................... 2013-121601

(51) Int. Cl.
*H02K 1/32*   (2006.01)
*H02K 1/27*   (2006.01)
(Continued)

(52) U.S. Cl.
CPC .............. *H02K 1/276* (2013.01); *H02K 1/06* (2013.01); *H02K 1/16* (2013.01); *H02K 1/2766* (2013.01);
(Continued)

(58) Field of Classification Search
CPC  H02K 1/06; H02K 1/27; H02K 1/276; H02K 1/2766; H02K 1/32; H02K 9/10
See application file for complete search history.

(56) References Cited

U.S. PATENT DOCUMENTS

2013/0147299 A1* 6/2013 Rahman ............... H02K 1/2706
                                                             310/156.01

FOREIGN PATENT DOCUMENTS

JP     2002-58218 A    2/2002
JP     2004-312898 A   11/2004
(Continued)

OTHER PUBLICATIONS

International Search Report dated Jul. 29, 2014 in PCT/JP2014/062926 filed May 15, 2014.

*Primary Examiner* — Dang Le
(74) *Attorney, Agent, or Firm* — Oblon, McClelland, Maier & Neustadt, L.L.P.

(57) ABSTRACT

A rotating electric machine including a rotator including a small-angle rotator portion and a large-angle rotator portion respectively having different inter-magnet end angles, each being a plane angle formed between a line connecting one outermost peripheral-side end of a permanent magnet and an axial center of the rotator and a line connecting an outermost peripheral-side end of another permanent magnet and the axial center of the rotator. The rotator includes three layers of the small-angle rotator portion, the large-angle rotator portion, and the small-angle rotator portion, which are laminated in the stated order along an axial line of the rotator. Therefore, demagnetization due to a temperature rise of the permanent magnets is suppressed. In addition, a temperature distribution in the permanent magnets in the axial direction of the rotator is reduced.

9 Claims, 8 Drawing Sheets

(51) Int. Cl.
*H02K 9/10* (2006.01)
*H02K 1/06* (2006.01)
*H02K 1/16* (2006.01)
*H02K 29/03* (2006.01)

(52) U.S. Cl.
CPC ............. *H02K 1/32* (2013.01); *H02K 9/10* (2013.01); *H02K 29/03* (2013.01)

(56) References Cited

FOREIGN PATENT DOCUMENTS

| | | |
|---|---|---|
| JP | 2005-51982 A | 2/2005 |
| JP | 2006-115584 A | 4/2006 |
| JP | 2010-200510 A | 9/2010 |
| JP | 2011-15484 A | 1/2011 |

\* cited by examiner

AXIAL LENGTH

ROTATING ELECTRIC MACHINE

TECHNICAL FIELD

The present invention relates to a driving motor for an electric automobile, a hybrid vehicle, or the like, in particular, a rotating electric machine including permanent magnets embedded in an outer peripheral portion of a rotator core.

BACKGROUND ART

Hitherto, the following interior permanent magnet motor is known. Specifically, the interior permanent magnet motor includes a rotator core, in which two permanent magnets are embedded in a V-like pattern for one pole. The rotator core includes a first fractional rotator core and a second fractional rotator core obtained by dividing the rotator core in an axial direction of the rotator core. A width of a magnetic-path formation portion in a circumferential direction of the rotator core is set so as to be different for the first fractional rotator core and the second fractional rotator core (see, for example, Patent Literature 1).

CITATION LIST

Patent Literature

[PTL 1] JP 2006-115584 A

SUMMARY OF INVENTION

Technical Problem

In the interior permanent magnet motor, a cogging torque can be reduced. However, a smaller number of heat release paths are formed for the permanent magnets provided in a central portion in the axial direction of the rotator core as compared with that for the other portion, and hence temperature is more likely to rise in the central portion. Therefore, the interior permanent magnet motor has a problem in demagnetization due to a temperature rise of the permanent magnets.

Further, the interior permanent magnet motor has another problem when the permanent magnets have a large temperature distribution in the axial direction of the rotator core. Specifically, a temperature of the permanent magnets and an induced voltage of the motor have a correlation, but the induced voltage can be measured only with a magnetic flux at an average temperature of the permanent magnets. Therefore, the temperature of each of the permanent magnets cannot be predicted when the temperature distribution in the permanent magnets in the axial direction of the rotator core is large.

The present invention has been made to solve the problems described above, and has an object to provide a rotating electric machine capable of suppressing demagnetization due to a temperature rise of permanent magnets and reducing a temperature distribution in the permanent magnets in an axial direction of the rotating electric machine.

Solution to Problem

In the rotating electric machine according to one embodiment of the present invention, each of the plurality of permanent magnet groups (9, 33) is arranged symmetrically with respect to a center of the corresponding pole in the circumferential direction of the rotator (2); the rotator (2) includes a laminate of a plurality of rotator portions respectively having different inter-magnet end angles ($\theta 1$, $\theta 2$), each being a plane angle formed between a line that connects an outermost peripheral-side end of one of the at least one permanent magnet (10, 11, 31 to 33) and an axial center of the rotator (2) and a line that connects an outermost peripheral-side end of another of the at least one permanent magnet (10, 11, 31 to 33), which is opposed to the one of the at least one permanent magnet (10, 11, 31 to 33), and the axial center of the rotator (2); and one of the plurality of rotator portions having the larger inter-magnet end angle ($\theta 2$) is arranged at a position closer to a central portion of the rotator (2) in an axial line of the rotator (2).

Further, in the rotating electric machine according to one embodiment of the present invention, each of the plurality of permanent magnet groups (9, 33) is arranged symmetrically with respect to a center of the corresponding pole in the circumferential direction of the rotator (2); the rotator (2) includes a laminate of a plurality of rotator portions respectively having different inter-magnet end angles ($\theta 1$, $\theta 2$), each being a plane angle formed between a line that connects an outermost peripheral-side end of one of the at least one permanent magnet (10, 11, 31 to 33) and an axial center of the rotator (2) and a line that connects an outermost peripheral-side end of another of the at least one permanent magnet (10, 11, 31 to 33), which is opposed to the one of the at least one permanent magnet (10, 11, 31 to 33), and the axial center of the rotator (2); and one of the plurality of rotator portions having the inter-magnet end angle ($\theta 2$) is arranged on a downstream side of the ventilation path (20), which is larger than the inter-magnet end angle of another of the plurality of rotator portions arranged on an upstream side of the ventilation path (20).

Advantageous Effects of Invention

According to the rotating electric machine of the one embodiment of the present invention, the rotator portion having the larger inter-magnet end angle with the smaller heat generation amount is arranged closer to the central portion in the axial line of the rotating electric machine. Therefore, the demagnetization due to a temperature rise of the permanent magnets is suppressed. In addition, the temperature distribution in the permanent magnets in the axial direction of the rotating electric machine may be reduced.

Further, according to the rotating electric machine of the one embodiment of the present invention, the rotator portion having the larger inter-magnet end angle with the smaller heat generation amount is arranged on the downstream side of the ventilation path as compared with the inter-magnet end angle and the heat generation amount of the rotator portion arranged on the upstream side. Therefore, the demagnetization due to the temperature rise of the permanent magnets may be suppressed. In addition, the temperature distribution in the permanent magnets in the axial direction of the rotating electric machine may be reduced.

DESCRIPTION OF EMBODIMENTS

Figure 1:
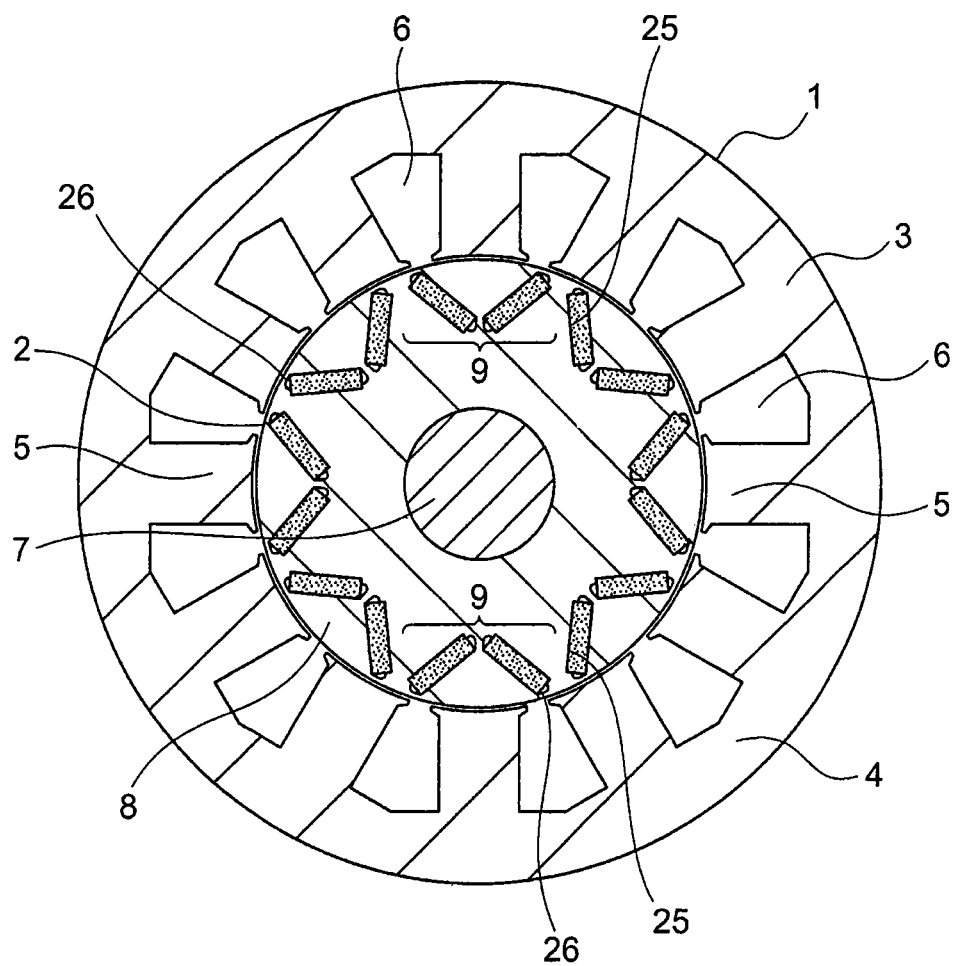
FIG. 1 is a front sectional view of a main part, for illustrating a motor according to a first embodiment of the present invention.

Referring to the drawings, embodiments of the present invention are described below. In the drawings, the same or corresponding components and parts are denoted by the same reference symbols.

First Embodiment

Figure 2:
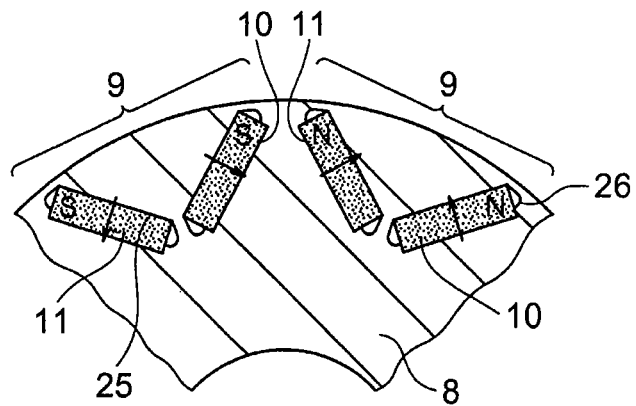
FIG. 2 is an enlarged view of the main part, for illustrating the motor illustrated in FIG. 1.

FIG. 1 is a front sectional view of a main part, for illustrating a motor that is a rotating electric machine according to a first embodiment of the present invention, and FIG. 2 is an enlarged view of the main part, for illustrating the motor illustrated in FIG. 1.

The motor includes a stator 1 and a rotator 2. The stator 1 includes a stator core 3 and stator coils (not shown). The stator core 3 includes twelve slots 6 formed by teeth 5 that are formed at intervals in a circumferential direction of the stator core 3 so as to extend radially inward from a core back 4 having an annular shape. The rotator 2 is arranged coaxially with the stator core 3 on an inner peripheral side of the stator 1 so as to be rotatable.

The stator core 3 is formed by laminating thin steel plates.

The stator coils include three-phase (U-phase, V-phase, and W-phase) windings wound around the teeth 5. One end of a conductive wire of the winding of each of the phases is connected to an inverter, whereas the other end of the conductive wire is connected to a neutral line of another one of the phases as a neutral line.

The rotator 2 includes a rotary shaft 7, a rotator core 8, and permanent magnet groups 9. The rotator core 8 is fixed to the rotary shaft 7 by press-fitting, thermal insert, or a key. The permanent magnet groups 9 are embedded in an outer peripheral portion of the rotator core 8 at intervals in a circumferential direction of the rotator core 8. Each of the permanent magnet groups 9 includes two permanent magnets, that is, a first permanent magnet 10 and a second permanent magnet 11, each having a rectangular shape, for one pole.

The rotator core 8, which is formed by laminating thin steel plates, includes a plurality of magnet accommodating holes 25 that extend in an axial direction of the rotator core 8 and accommodate the first permanent magnets 10 and the second permanent magnets 11 therein. The first permanent magnet 10 and the second permanent magnet 11 respectively accommodated in the magnet accommodating holes 25 are arranged such that a distance therebetween in the circumferential direction of the rotator core 8 is increased along a radially outer direction of the rotator core 8.

For the permanent magnet groups 9, each being arranged in the V-like pattern, the N pole and the S pole are alternately set along the circumferential direction of the rotator core 8, as illustrated in FIG. 2. The arrows in FIG. 2 indicate orientations of the permanent magnets 10 and 11.

Note that, gap portions 26 are formed at both ends of each of the magnet accommodating holes 25. Due to the gap portions 26, a so-called leakage flux that goes directly from the N pole to the neighboring S pole is suppressed between the adjacent permanent magnet groups 9.

Figure 3A:
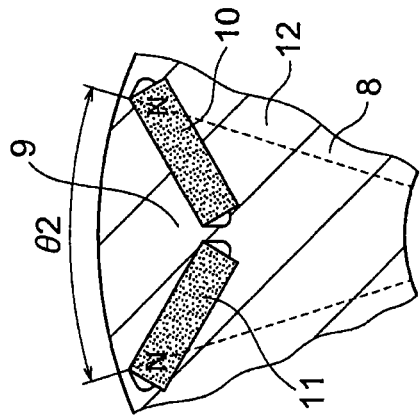
FIG. 3A is a side sectional view of the main part, for illustrating the rotator illustrated in FIG. 1.
Figure 3B:
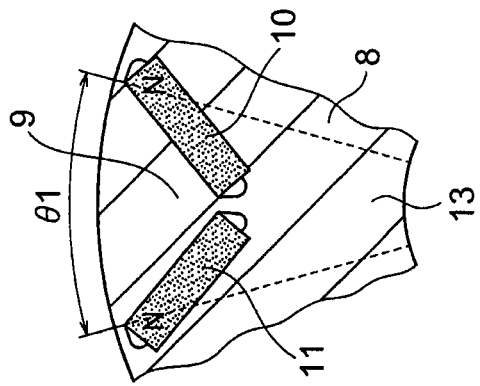
FIG. 3B is a front sectional view of the main part, for illustrating a small-angle rotator portion illustrated in FIG. 3A.
Figure 3C:
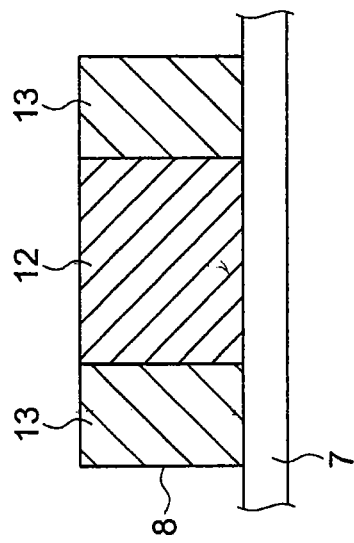
FIG. 3C is a front sectional view of the main part, for illustrating a large-angle rotator portion illustrated in FIG. 3A.

FIG. 3A is a side sectional view of the main part, for illustrating the rotator 2 illustrated in FIG. 1, FIG. 3B is a front sectional view of the main part, for illustrating a small-angle rotator portion 13 illustrated in FIG. 3A, and FIG. 3C is a front sectional view of the main part, for illustrating a large-angle rotator portion 12 illustrated in FIG. 3A.

The rotator 2 is formed by laminating the small-angle rotator portions 13 and the large-angle rotator portion 12. Each of the small-angle rotator portions 13 has an inter-magnet end angle $\theta 1$ that is a plane angle formed between a line that connects an outermost peripheral-side end of the first permanent magnet 10 and an axial center of the rotator 2 and a line that connects an outermost peripheral-side end of the second permanent magnet 11 of the same permanent magnet group 9, which is opposed to the first permanent magnet 10, and the axial center of the rotator 2. The large-angle rotator portion 12 has an inter-magnet end angle $\theta 2$, which is formed in the similar manner. The inter-magnet end angles $\theta 1$ and $\theta 2$ are different from each other.

The inter-magnet end angle $\theta 1$ of the small-angle rotator portions 13 illustrated in FIG. 3B is smaller than the inter-magnet end angle $\theta 2$ of the large-angle rotator portion 12 illustrated in FIG. 3C.

The rotator 2 of the motor illustrated in FIG. 1 includes three layers of the small-angle rotator portion 13, the large-angle rotator portion 12, and the small-angle rotator portion 13 laminated in the stated order in an axial direction of the rotator 2.

In the motor having the configuration described above, a rotating electric field is generated in the stator 1 by causing a three-phase AC current to flow through the stator coils of the stator 1. The rotating electric field attracts the permanent magnet groups 9 of the rotator 2. As a result, the rotator 2 rotates about the rotary shaft 7.

Figure 4:
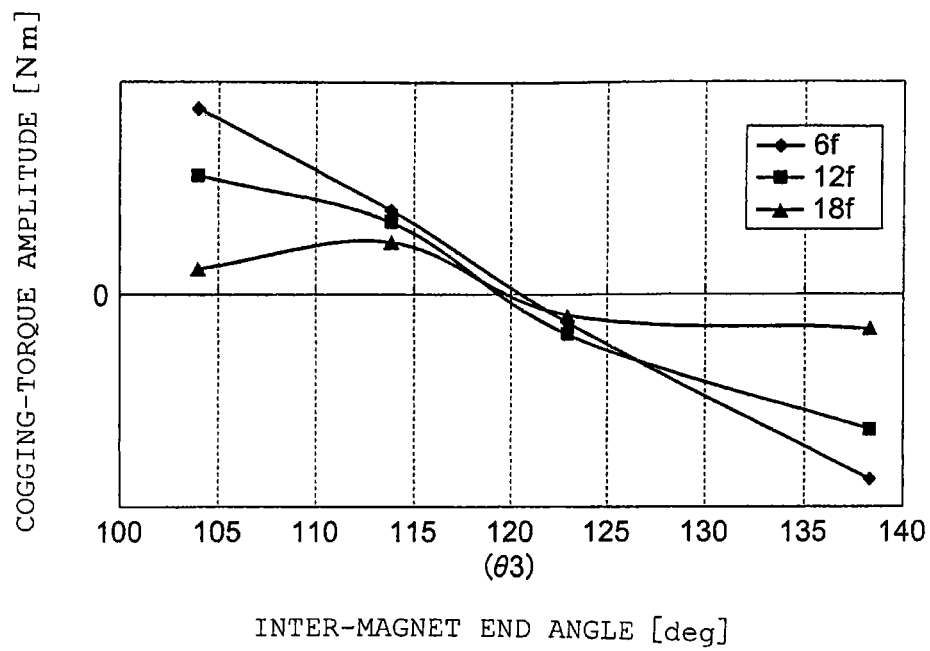
FIG. 4 is a graph for showing a relationship between the inter-magnet end angle and an amplitude of each of frequency components of a cogging torques.

FIG. 4 is a graph for showing a relationship between the inter-magnet end angle and an amplitude of each of frequency components of a cogging torque, which is obtained by the inventors of the present invention through electromagnetic analysis.

In FIG. 4, the inter-magnet end angle that is converted into an electric angle is indicated on the horizontal axis. Each of the frequency components of the cogging torque becomes the smallest in the vicinity of the electric angle of 120 degrees (inter-magnet end angle θ3), and increases in a positive direction at the electric angle of 120 degrees or smaller and increases in a negative direction at the electric angle of 120 degrees or larger.

Here, a change in sign of the cogging torque indicates the inversion of the phase of each of the frequency components at 180 degrees. In this case, a 6f component (f: fundamental frequency) at the inter-magnet end angle of 100 degrees in electric angle is defined as being located on the positive side.

For example, for a rotator having the inter-magnet end angle of 110 degrees in electric angle and a rotator having the inter-magnet end angle of 130 degrees in electric angle, magnitudes of the amplitudes of the frequency components 6f, 12f, and 18f of the cogging torque are approximately the same, whereas phases are inverted at 180 degrees (having the same magnitude in the positive direction and the negative direction). Therefore, by laminating the rotator portion having the inter-magnet end angle of 110 degrees in electric angle and the rotator portion having the inter-magnet end angle of 130 degrees in electric angle such that the rotator portions have the same axial length, the cogging torque is reduced.

Figure 5:
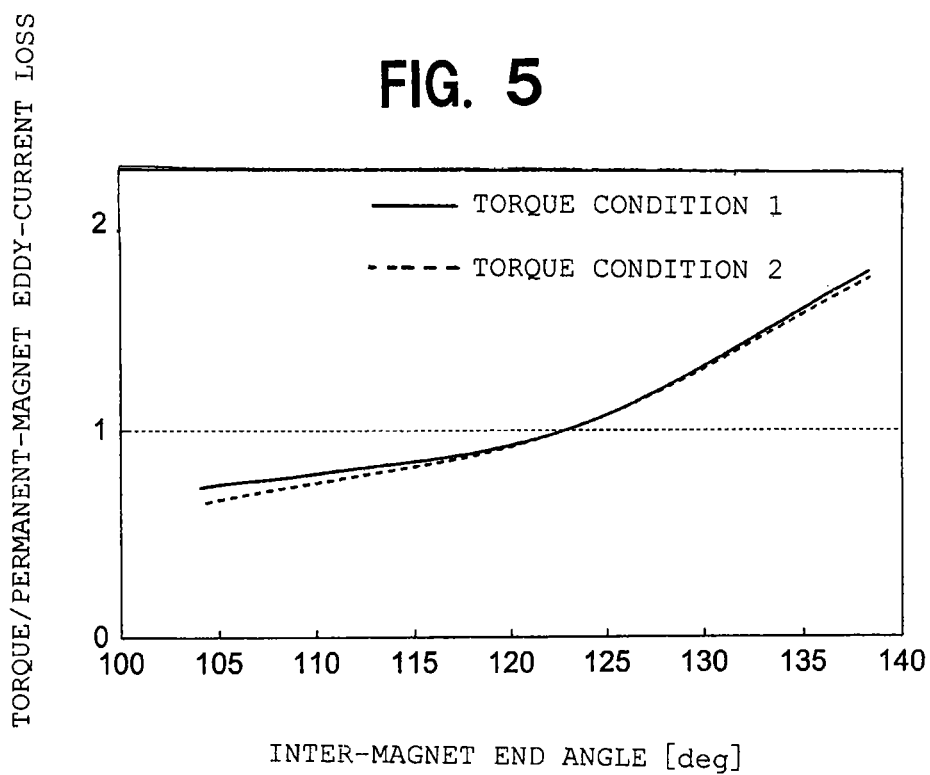
FIG. 5 is a graph for showing a relationship between an inter-magnet end angle and a torque per eddy-current loss of the permanent magnets.

FIG. 5 is a graph for showing a relationship between the inter-magnet end angle and a torque per eddy-current loss of the permanent magnets, which is obtained by the inventors of the present invention through electromagnetic analysis.

In FIG. 5, a torque condition 1 corresponds to rotation at a low speed, whereas a torque condition 2 corresponds to rotation at a high speed. The two conditions are both shown in a case where the inter-magnet end angle of 123 degrees in electric angle is used as a reference.

As shown in FIG. 5, the torque per eddy-current loss of the permanent magnets increases monotonously regardless of the torque conditions and becomes larger as the inter-magnet end angle increases.

Specifically, the small-angle rotator portion 13 having the smaller inter-magnet end angle θ1 has a heat generation amount larger than that generated in the large-angle rotator portion 12 having the larger inter-magnet end angle θ2.

Figure 6:
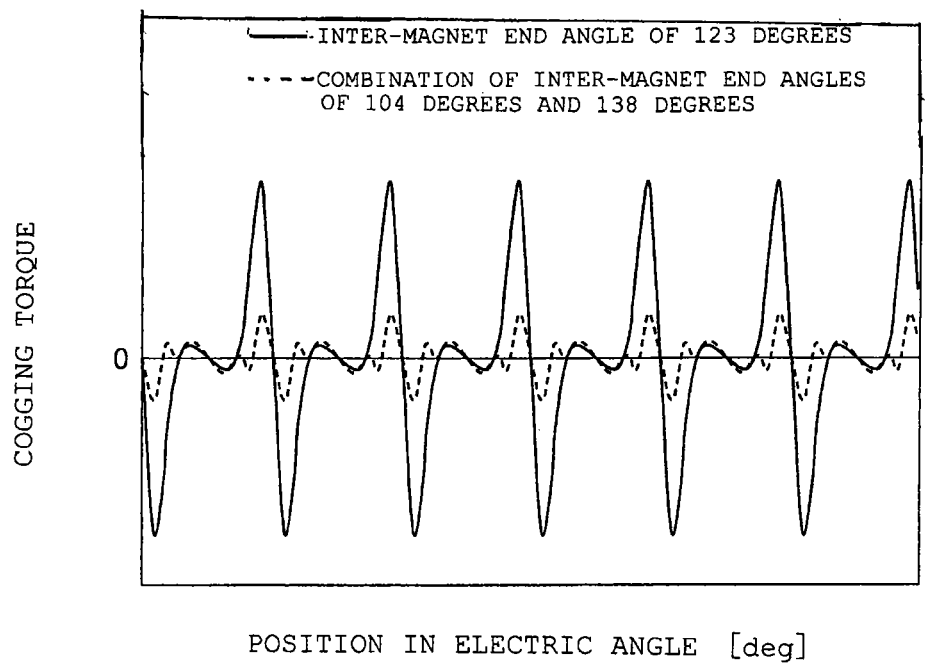
FIG. 6 is a graph for showing a relationship between a position in electric angle and the cogging-torque according to a motor illustrated in FIG. 1.

Next, cogging-torque waveforms of a motor having the inter-magnet end angle of 123 degrees in electric angle and a motor having a combination of the inter-magnet end angle of 104 degrees and the inter-magnet end angle of 138 degrees in electric angle are respectively shown in FIG. 6.

The thick line in FIG. 6 represents the rotator having the inter-magnet end angle of 123 degrees, and the dashed line represents the motor including the small-angle rotator portions 13 having the inter-magnet end angle of 104 degrees and the large-angle rotator portion 12 having the inter-magnet end angle of 138 degrees laminated so as to have the same axial length.

Through comparison of the cogging-torque waveforms, it is understood that the motor including the laminate of the small-angle rotator portions 13 and the large-angle rotator portion 12 has a reduced cogging torque as compared with the motor having the inter-magnet end angle of 123 degrees in electric angle.

Figure 7:
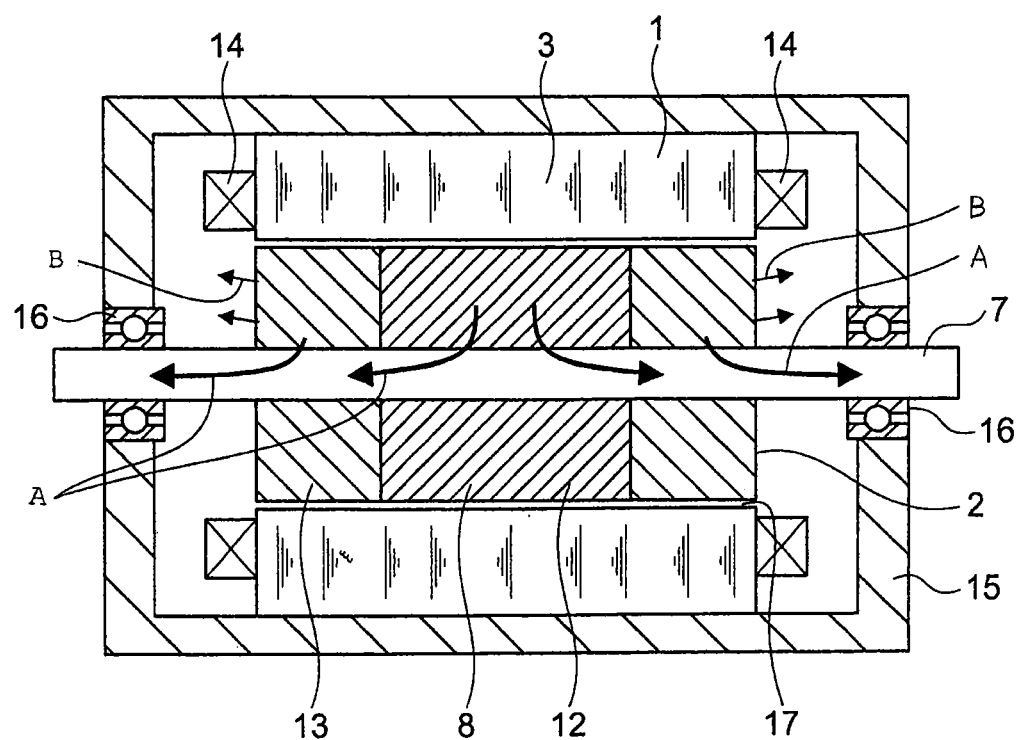
FIG. 7 is a graph for showing a heat release path according to a motor illustrated in FIG. 1.

Next, heat release paths for heat generated in the rotator 2 are described referring to FIG. 7.

FIG. 7 is a sectional view for illustrating the motor cut along an axial direction of the motor. The motor illustrated in FIG. 7 is not configured to be directly cooled by outside air and is a so-called "totally enclosed motor".

The rotator 2 including the three layers of the small-angle rotator portion 13, the large-angle rotator portion 12, and the small-angle rotator portion 13 laminated in the stated order along the axial direction of the rotator 2 is accommodated inside a frame 15 having a cylindrical shape. An axial length of the large-angle rotator portion 12 and a total axial length of the pair of small-angle rotator portions 13 are equal to each other. Both end portions of the rotary shaft 7 of the rotator 2 are supported rotatably by the frame 15 through bearings 16. Note that, the stator coils have coil ends 14 as illustrated in FIG. 7.

Heat generated in the large-angle rotator portion 12 of the rotator 2 is transferred to the rotary shaft 7 mainly through heat release paths A and is emitted outside through the rotary shaft 7.

On the other hand, heat generated in the small-angle rotator portions 13 of the rotator 2 is released outside through the heat release paths A in the rotary shaft 7 and is also emitted directly to air surrounding the rotator 2 as indicated by heat release paths B so as to be released outside through the air and the frame 15.

Note that, a clearance 17 is also present between the stator 1 and the rotator 2. Therefore, a part of the heat generated in the rotator 2 is also released outside even through the clearance 17.

As described above, each of the small-angle rotator portions 13 arranged on both sides of the rotator 2 has the heat release paths A and B, whereas the large-angle rotator portion 12 arranged in an intermediate portion of the rotator 2 has the heat release paths A as main heat release paths.

Incidentally, when the length of the rotator in the axial direction is long and the rotator having an uniform electric angle of the inter-magnet end angle in an axial line of the rotator is used, the heat release paths are limited in the intermediate portion of the rotator as compared with the portions on the both sides of the rotator. Therefore, a temperature of the intermediate portion becomes higher as compared with a temperature of the portions on the both sides.

Meanwhile, a permanent magnet formed by using neodymium has a problem in that demagnetization is more likely to occur as the temperature rises. Further, the eddy-current loss of the permanent magnets, which is generated by the magnetic flux of the stator coils generated in the stator 1, is the same at any positions in the axial direction of the rotator.

Therefore, the number of heat release paths is smaller in the central portion of the rotator in the axial direction of the rotator, and hence the temperature of the permanent magnets disadvantageously rises in the central portion. As a result, the permanent magnets are more likely to be demagnetized.

On the other hand, the motor according to the first embodiment includes the small-angle rotator portions 13 having a larger heat generation amount than the large-angle rotator portion 12, which are arranged on the both sides of the rotator 2 where the heat release paths A and B are present to provide an excellent heat release property, and the large-angle rotator portion 12 having a smaller heat generation amount than the small-angle rotator portions 13, which is arranged in the intermediate portion of the rotator 2 where a heat release property is lower.

Therefore, the temperature rise in the intermediate portion of the rotator 2 in the axial direction of the rotator 2 can be prevented. In addition, the heat from the small-angle rotator portions 13 having the larger heat generation amount can be efficiently released through the heat release paths A and B.

Figure 8:
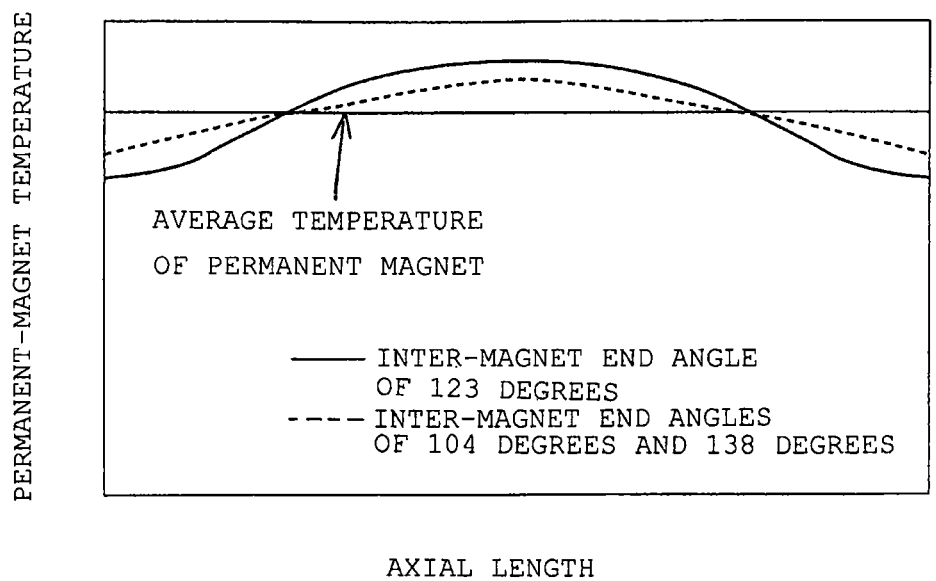
FIG. 8 is a graph for showing a relationship between an axial length and a permanent-magnet temperature according to a motor illustrated in FIG. 1.

FIG. 8 is a graph for showing a relationship between the axial length and the permanent magnet temperature for the motor according to the first embodiment and a motor of a comparative example of the present invention. The motor according to the first embodiment includes the small-angle rotator portions 13 having the inter-magnet end angle θ1 of 123 degrees in electric angle and the large-angle rotator portion 12 having the inter-magnet end angle θ2 of 138 degrees in electric angle, which are laminated in the order of the small-angle rotator portion 13, the large-angle rotator portion 12, and the small-angle rotator portion 13. The motor of the comparative example has the inter-magnet end angle of 123 degrees in electric angle, which is uniform in an axial direction of the rotator.

As is understood from FIG. 8, a temperature distribution of the permanent magnets 10 and 11 in the axial direction of the rotator 2 can be reduced in the motor according to the first embodiment as compared with the motor of the comparative example. In addition, the cogging torque can be reduced as shown in FIG. 6.

Further, the highest temperature of the permanent magnets 10 and 11 can be reduced. Therefore, the demagnetization of the permanent magnets due to local heat generation can be prevented.

Further, when the permanent magnet temperature of the motor is monitored with the magnetic flux, a magnetic flux amount can only be monitored at an average temperature of the motor (shown in FIG. 8).

Therefore, in the case of the motor of the comparative example, the temperature distribution of the permanent magnets in the axial direction of the rotator 2 is large, and hence a difference between the highest temperature and the average temperature disadvantageously increases. On the other hand, in the motor of the first embodiment, the difference between the highest temperature and the average temperature of the permanent magnets 10 and 11 is small. Therefore, the temperature of the permanent magnets 10 and 11 can easily be estimated from an induced voltage and the magnetic flux amount of the motor.

Second Embodiment

Figure 9:
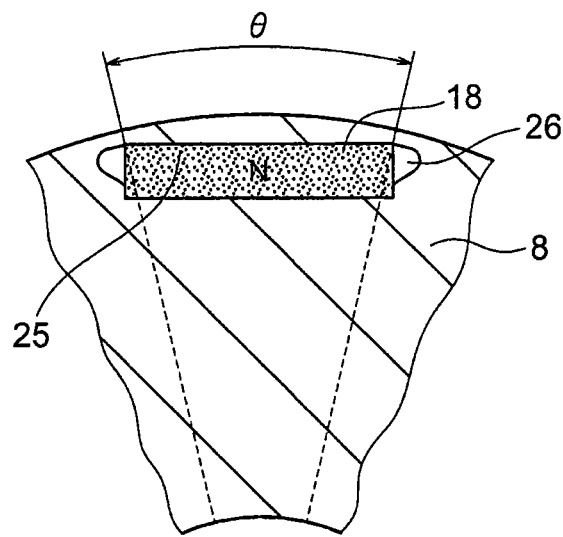
FIG. 9 is a front sectional view of a main part, for illustrating a motor according to a second embodiment of the present invention.

FIG. 9 is a front sectional view of a main part, for illustrating a motor according to a second embodiment of the present invention.

In the second embodiment, the rotator 2 includes the rotator core 8 and a plurality of permanent magnets 18. The permanent magnets 18 are embedded in the outer peripheral portion of the rotator core 8 at intervals in the circumferential direction of the rotator core 8. Each of the permanent magnets 18 includes one permanent magnet having a rectangular shape for one pole.

The rotator core 8, which is formed by laminating thin steel plates, includes the plurality of magnet accommodating holes 25 that extend in the axial direction of the rotator core 8 and accommodate the permanent magnets 18 therein. The permanent magnet 18 accommodated in each of the magnet accommodating holes 25 is arranged such that a perpendicular bisector of the permanent magnet 18 passes through the axial center of the rotator 2.

The permanent magnets 18 are arranged along the circumferential direction of the rotator 2 such that the N pole and the S pole are set alternately.

Note that, the gap portions 26 are formed at the both ends of each of the magnet accommodating holes 25. Due to the gap portions 26, a so-called leakage flux that goes directly from the N pole to the neighboring S pole is suppressed between the adjacent permanent magnet groups 18.

The rotator 2 includes laminated two kinds of rotator portions. The two kinds of rotator portions have different inter-magnet end angles θ, each being a plane angle formed between a line that connects one outermost peripheral-side end of the permanent magnet 18 and the axial center of the rotator 2 and a line that connects the other outermost peripheral-side end of the permanent magnet 18 and the axial center of the rotator 2.

The rotator 2 according to the second embodiment includes the three layers of the small-angle rotator portion 13, the large-angle rotator portion 12, and the small-angle rotator portion 13, which are laminated in the stated order, as in the case of the first embodiment.

The remaining configuration is the same as that of the motor of the first embodiment.

Figure 10:
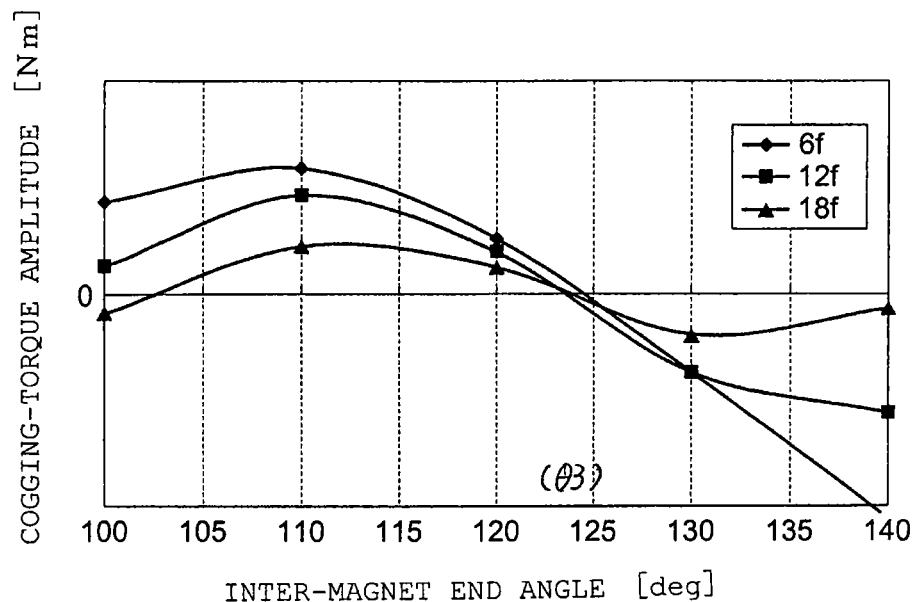
FIG. 10 is a graph for showing a relationship between an inter-magnet end angle and an amplitude of a cogging torque according to a motor illustrated in FIG. 9.

FIG. 10 is a graph for showing a relationship between the inter-magnet end angle and the amplitude of each of the frequency components of the cogging torque in the rotator 2 including the permanent magnets 18.

As can be seen from FIG. 10, each of the frequency components of the cogging torque becomes the smallest in the vicinity of 123 degrees of the inter-magnet end angle θ3. When the inter-magnet end angle is θ3 or larger, the cogging torque increases negatively. When the inter-magnet end angle is θ3 or smaller, the cogging torque increases positively.

Figure 11:
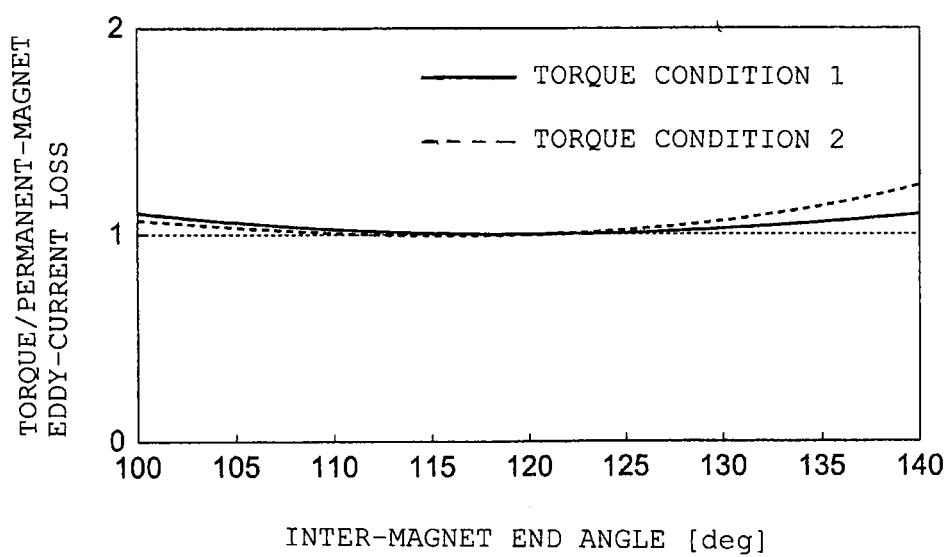
FIG. 11 is a graph for showing a relationship between an inter-magnet end angle and an torque per magnet eddy-current loss according to a motor illustrated in FIG. 9.

Further, a relationship between the torque per magnet eddy-current loss and the inter-magnet end angle is shown in FIG. 11.

Note that, in FIG. 11, the torque condition 1 corresponds to rotation at a low speed, whereas the torque condition 2 corresponds to rotation at a high speed. It is shown that as a value of the torque per magnet eddy-current loss increases, a magnet heat generation amount per torque decreases.

As shown in FIG. 11, the following is understood. Specifically, the torque per magnet eddy-current loss is the smallest in the vicinity of the inter-magnet end angle of 120 degrees. When the inter-magnet end angle is smaller than or larger than 120 degrees, the torque per eddy-current loss of the permanent magnets 18 increases.

Specifically, the heat generation amount is the largest in the vicinity of the inter-magnet end angle of 120 degrees. Further, under the torque condition 2 (during the rotation at a high speed), an increase rate of the torque per magnet eddy-current loss is larger in the case where the inter-magnet end angle is larger than 120 degrees than in the case where the inter-magnet end angle is smaller than 120 degrees.

Figure 12:
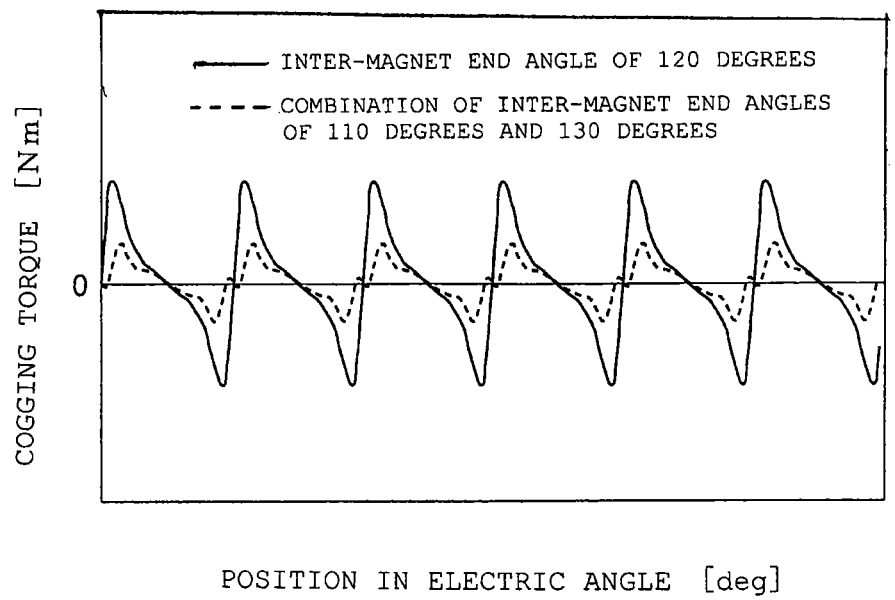
FIG. 12 is a graph for showing a relationship between an inter-magnet end angle and a cogging torque according to a motor illustrated in FIG. 9.

FIG. 12 is a graph for showing cogging-torque waveforms of a motor having the inter-magnet end angle of 120 degrees in electric angle and a motor including the small-angle rotator portions 13 having the inter-magnet end angle of 104 degrees in electric angle and the large-angle rotator portion 12 having the inter-magnet end angle of 138 degrees in electric angle laminated so as to have the same axial length.

Similarly to the motor of the first embodiment, the small-angle rotator portions 13 and the large-angle rotator portion 12 are combined such that a ratio of the total length of the small-angle rotator portions 13 and the length of the large-angle rotator portion 12 in the axial direction of the rotator 2 is 1:1.

From FIG. 12, it is understood that the cogging torque of the motor of the second embodiment is reduced as compared with the motor having the uniform inter-magnet end angle.

The motor of the second embodiment includes the three layers of the small-angle rotator portion 13, the large-angle rotator portion 12, and the small-angle rotator portion 13 laminated in the stated order along the axial direction of the rotator 2. The large-angle rotator portion 12 that has a heat generation amount smaller than that generated in the small-angle rotator portions 13, in particular, during the rotation at a high speed, is arranged in the intermediate portion of the rotator 2, which has lower heat release efficiency. Therefore, similarly to the first embodiment, the temperature distribution in the rotator 2 in the axial direction of the rotator 2 is reduced. In addition, local thermal demagnetization can be suppressed.

Further, the inter-magnet end angle of the large-angle rotator portion 12 is 130 degrees, and the inter-magnet end angle of each of the small-angle rotator portions 13 is 110 degrees. The inter-magnet end angle of 123 degrees at which the cogging torque becomes the smallest lies between the above-mentioned two inter-magnet end angles. Therefore, cogging of the motor can be significantly reduced.

Third Embodiment

Figure 13:
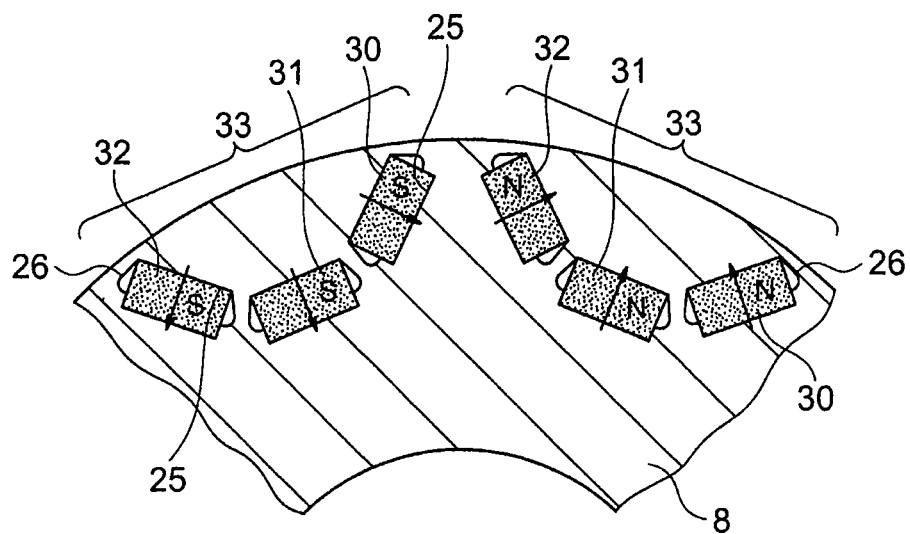
FIG. 13 is a front sectional view of a main part, for illustrating a motor according to a third embodiment of the present invention.

FIG. 13 is a front sectional view of a main part, for illustrating a motor according to a third embodiment of the present invention.

The rotator 2 includes the rotary shaft 7, the rotator core 8, and permanent magnet groups 33. The rotator core 8 is fixed to the rotary shaft 7 by press-fitting, thermal insert, or a key. The permanent magnet groups 33 are embedded in the outer peripheral portion of the rotator core 8 at intervals in the circumferential direction of the rotator core 8. Each of the permanent magnet groups 33 includes three permanent magnets, that is, a first permanent magnet 30, a second permanent magnet 31, and a third permanent magnet 32, each having a rectangular shape, for one pole.

The rotator core 8, which is formed by laminating thin steel plates, includes the plurality of magnet accommodating holes 25 that extend in the axial direction of the rotator core 8 and accommodate the first permanent magnets 30, the second permanent magnets 31, and the third permanent magnets 32 therein. The first permanent magnet 30 and the third permanent magnet 32, which are located on respective sides of the second permanent magnet 31, are arranged such that a distance therebetween in the circumferential direction of the rotator core 8 is increased along the radially outer direction.

The permanent magnet groups 33, each being arranged in a U-like pattern, are arranged such that the N pole and the S pole are alternately set along the circumferential direction of the rotator core 8, as illustrated in FIG. 13. The arrows in FIG. 13 indicate orientations of the permanent magnets 30, 31, and 32.

Note that, the gap portions 26 are formed at the both ends of each of the magnet accommodating holes 25. Due to the gap portions 26, a leakage flux that goes directly from the N pole to the neighboring S pole is suppressed between the adjacent permanent magnet groups 33.

The rotator 2 includes laminated two kinds of rotator portions, namely, the large-angle rotator portion 12 and the small-angle rotator portion 13. The large-angle rotator portion 12 and the small-angle rotator portion 13 have different inter-magnet end angles, each being a plane angle formed between a line that connects one outermost peripheral-side end of the permanent magnet group 33 and the axial center of the rotator 2 and a line that connects the other outermost peripheral-side end of the permanent magnet group 33 and the axial center of the rotator 2.

The rotator 2 of the third embodiment includes the three layers of the small-angle rotator portion 13, the large-angle rotator portion 12, and the small-angle rotator portion 13 laminated in the stated order along the axial direction of the rotator 2.

Further, the value of the inter-magnet end angle at which the cogging torque becomes the smallest lies between a value of the inter-magnet end angle of the large-angle rotator portion 12 and a value of the inter-magnet end angle of the small-angle rotator portions 13.

The remaining configuration is the same as that of the motor of the first embodiment.

Similarly to the motor of the first embodiment, the motor of the third embodiment also has a reduced temperature distribution of the rotator 2 in the axial direction of the rotator 2. Further, the local thermal demagnetization can be suppressed.

Moreover, the value of the inter-magnet end angle at which the cogging torque becomes the smallest lies between the value of the inter-magnet end angle of the large-angle rotator portion 12 and the value of the inter-magnet end angle of the small-angle rotator portions 13. Therefore, the cogging of the motor can be significantly reduced.

Fourth Embodiment

Figure 14:
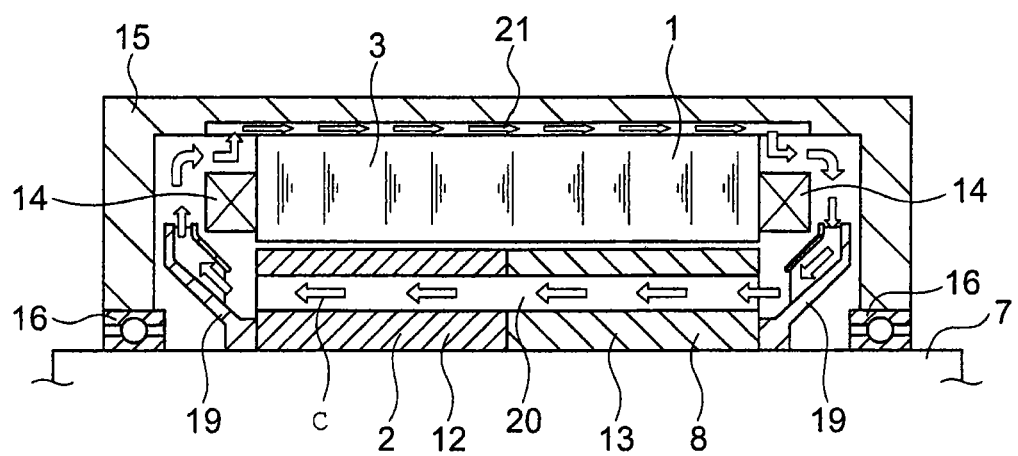
FIG. 14 is a sectional view of a motor according to a fourth embodiment of the present invention, cut along the axial direction of a motor.

FIG. 14 is a sectional view of a motor according to a fourth embodiment, cut along the axial direction of the motor.

The rotator 2 includes two layers of the small-angle rotator portion 13 and the large-angle rotator portion 12 laminated along the axial direction of the rotator 2. The rotator 2 is accommodated inside the frame 15 having a cylindrical shape. The both end portions of the rotary shaft 7 of the rotator 2 are supported rotatably by the frame 15 through the bearings 16. The length of the small-angle rotator portion 13 and the length of the large-angle rotator portion 12 in the axial direction of the rotator 2 are equal to each other.

Cooling fans (not shown) are fixed on both side end surfaces of the rotator core 8 of the rotator 2. Further, on the inner side of the permanent magnet groups 9, a plurality of ventilation paths 20 extending in the axial direction of the rotator 2 are formed equiangularly.

A plurality of grooves 21 extending in the axial direction of the rotator 2 are formed equiangularly on an inner wall surface of the frame 15.

Cooling air C generated by rotation of the cooling fans is guided by guides 19 to pass through the ventilation paths 20 and the grooves 21 to flow into the ventilation paths 20 again. The heat from the rotator 2 and the stator 1 is emitted outside through the frame 15.

The small-angle rotator portion 13 of the fourth embodiment is the same as the small-angle rotator portion 13 of the first embodiment, which includes the permanent magnet groups 9. The large-angle rotator portion 12 is the same as the large-angle rotator portion 12 of the first embodiment, which includes the permanent magnet groups 9.

Here, as described in the first embodiment, the heat generation amount of the small-angle rotator portion 13 is larger than that of the large-angle rotator portion 12. The small-angle rotator portion 13 is arranged on an upstream side of the cooling air C, whereas the large-angle rotator portion 12 is arranged on a downstream side of the cooling air C.

The remaining configuration is the same as that of the motor of the first embodiment.

According to the motor of the fourth embodiment, the small-angle rotator portion 13 that has a larger heat generation amount is arranged on the upstream side of the cooling air C. The small-angle rotator portion 13 is cooled on the upstream side where a temperature of the cooling air C is low, and is therefore more efficiently cooled. As a result, a temperature rise in the small-angle rotator portion 13 is suppressed.

Therefore, similarly to the first embodiment, the temperature distribution of the rotator 2 in the axial direction of the rotator 2 is reduced. In addition, the local thermal demagnetization can be suppressed.

Further, the difference between the highest temperature and the average temperature of the permanent magnet groups 9 is small, and hence the temperature of the permanent magnets 10 and 11 can easily be estimated from the induced voltage and the magnetic flux amount of the motor.

Further, the value of the inter-magnet end angle at which the cogging torque becomes the smallest lies between the value of the inter-magnet end angle of the large-angle rotator portion 12 and the value of the inter-magnet end angle of the small-angle rotator portion 13. Therefore, the cogging of the motor can be significantly reduced.

Although the small-angle rotator portion 13 and the large-angle rotator portion 12, each including the permanent magnet groups 9, are used in the fourth embodiment, the permanent magnet 18 having a rectangular shape and being provided for per pole may be used as described in the second embodiment.

In this case, the torque per eddy-current loss of the permanent magnets 18 becomes the smallest in the vicinity of the inter-magnet end angle of 120 degrees, as shown in FIG. 11. That is, the eddy-current loss per torque becomes the largest at the inter-magnet end angle of 120 degrees.

Therefore, when a combination of the inter-magnet end angle of 110 degrees and the inter-magnet end angle of 130 degrees is used, it is only necessary that the rotator core having the inter-magnet end angle with the larger magnet eddy-current loss is arranged on the upstream side of the cooling air and the rotator core having the inter-magnet end angle with the smaller magnet eddy-current loss is arranged on the downstream side of the cooling air.

Further, the small-angle rotator portion 13 and the large-angle rotator portion 12 including the permanent magnet groups 33 each including the three rectangular permanent magnets 30, 31, and 32 for one pole, such as the small-angle rotator portion 13 and the large-angle rotator portion 12 including the permanent magnet groups 33 described in the third embodiment, may be used. Further, the rotator 2 may include the small-angle rotator portion 13 arranged on the upstream side and the large-angle rotator portion 12 arranged on the downstream side, which has the same axial length as the small-angle rotator portion 13.

The rotator 2 according to each of the first to third embodiments described above includes the three layers of the small-angle rotator portion 13, the large-angle rotator portion 12, and the small-angle rotator portion 13, which are laminated in the stated order. However, for example, a rotator may include three kinds of rotator portions respectively having different inter-magnet end angles, that is, a small-angle rotator portion, a medium-angle rotator portion, and a large-angle rotator portion, thereby including five layers of the small-angle rotator portion, the medium-angle rotator portion, the large-angle rotator portion, the medium-angle rotator portion, and the small-angle rotator portion laminated in the stated order. Note that, the medium-angle rotator portion has a magnitude of the inter-magnet end angle that lies between the inter-magnet end angle of the large-angle rotator portion and the inter-magnet end angle of the small-angle rotator portion.

Further, although the motor has been described as the rotating electric machine in each of the embodiments described above, the present invention is also applicable to a power generator.

REFERENCE SIGNS LIST

1 stator, 2 rotator, 3 stator core, 4 core back, 5 tooth, 6 slot, 7 rotary shaft, 8 rotator core, 9, 33 permanent magnet group, 10 first permanent magnet, 11 second permanent magnet, 12 large-angle rotator portion, 13 small-angle rotator portion, 14 coil end, 15 frame, 16 bearing, 17 clearance, 18 permanent magnet, 19 guide, 20 ventilation path, 21 groove, 25 magnet accommodating hole, 26 gap portion, 30 first permanent magnet, 31 second permanent magnet, 32 third permanent magnet, A, B heat release path, C cooling air.

The invention claimed is:

1. A rotating electric machine, comprising:
a stator comprising:
a stator core having a slot formed by teeth formed at intervals in a circumferential direction of the stator core so as to extend radially inward from a core back having an annular shape; and
a stator coil wound around the slot; and
a rotator arranged coaxially with the stator core on an inner peripheral side of the stator so as to be rotatable, the rotator comprising:
a rotator core; and
a plurality of permanent magnet groups each including at least two permanent magnets having a rectangular shape for one pole, the plurality of permanent magnet groups being embedded in an outer peripheral portion of the rotator core at intervals in a circumferential direction of the rotator, or a plurality of permanent magnets each including one permanent magnet having a rectangular shape for one pole being embedded in an outer peripheral portion of the rotator core at intervals in a circumferential direction of the rotator,
when the rotator comprises the plurality of permanent magnet groups:
each of the plurality of permanent magnet groups is arranged symmetrically with respect to a center of the corresponding pole in the circumferential direction of the rotator;
the rotator includes a laminate of a plurality of rotator portions respectively having different inter-magnet end angles, each being a plane angle formed between a line that connects an outermost peripheral-side end of one of the at least two permanent magnets and an axial center of the rotator and a line that connects an outermost peripheral-side end of another of the at least two permanent magnets, and one of the plurality of rotator portions having the larger inter-magnet end angle is arranged at a position closer to a central portion of the rotator in an axial line of the rotator,
when the rotor comprises the plurality of permanent magnets:
each of the plurality of permanent magnets is arranged such that a perpendicular bisector of the permanent magnet passes through the axial center of the rotator;
the rotator includes a laminate of a plurality of rotator portions respectively having different inter-magnet end angles, each being a plane angle formed between a line that connects one outermost peripheral-side end of the permanent magnet and the axial center of the rotator and a line that connects the other outermost peripheral-side end of the permanent magnet and the axial center of the rotator, and one of the plurality of rotator portions having the larger inter-magnet end angle is arranged at a position closer to a central portion of the rotator in an axial line of the rotator, when the rotator comprises the plurality of permanent magnet groups or the plurality of permanent magnets:

the plurality of rotator portions include two kinds of rotator portions corresponding to a large-angle rotator portion and a small-angle rotator portion having the inter-magnet end angle smaller than the inter-magnet end angle of the large-angle rotator portion, the two kinds of rotator portions being laminated in order of the small-angle rotator portion, the large-angle rotator portion, and the small-angle rotator portion along the axial line of the rotator; and when a value of the inter-magnet end angle at which a cogging torque becomes the smallest is θ, a value of the inter-magnet end angle of the small-angle rotator portion is smaller than θ and a value of the inter-magnet end angle of the large-angle rotator portion is larger than θ.

2. A rotating electric machine according to claim 1, wherein the plurality of rotator portions further include a medium-angle rotator portion having a magnitude of the inter-magnet end angle that lies between the inter-magnet end angle of the large-angle rotator portion and the inter-magnet end angle of the small-angle rotator portion, the plurality of rotator portions being laminated in order of the small-angle rotator portion, the medium-angle rotator portion, the large-angle rotator portion, the medium-angle rotator portion and the small-angle rotator portion along the axial line of the rotator.

3. A rotating electric machine according to claim 1, wherein when the rotator comprises the plurality of permanent magnet groups, each of the plurality of permanent magnet groups is arranged in a V-like pattern and includes two permanent magnets.

4. A rotating electric machine according to claim 1, wherein when the rotator comprises the plurality of permanent magnet groups, each of the plurality of permanent magnet groups is arranged in a U-like pattern and includes three permanent magnets.

5. A rotating electric machine according to claim 1, wherein the rotator core includes magnet accommodating holes for accommodating the at least one permanent magnet therein, each of the magnet accommodating holes having gap portions on both sides of each of the at least one permanent magnet.

6. A rotating electric machine, comprising:
a stator comprising:
a stator core having a slot formed by teeth formed at intervals in a circumferential direction of the stator core so as to extend radially inward from a core back having an annular shape; and
a stator coil wound around the slot; and
a rotator arranged coaxially with the stator core on an inner peripheral side of the stator so as to be rotatable, the rotator comprising:
a rotator core including a ventilation path passing therethrough in an axial direction of the rotator; and
a plurality of permanent magnet groups each including at least two permanent magnets having a rectangular shape for one pole, the plurality of permanent magnet groups being embedded in an outer peripheral portion of the rotator core at intervals in the circumferential direction of the rotator, or a plurality of permanent magnets each including one permanent magnet having a rectangular shape for one pole being embedded in an outer peripheral portion of the rotator core at intervals in a circumferential direction of the rotator, when the rotator comprises the plurality of permanent magnet groups:

each of the plurality of permanent magnet groups is arranged symmetrically with respect to a center of the corresponding pole in the circumferential direction of the rotator;

the rotator includes a laminate of a plurality of rotator portions respectively having different inter-magnet end angles, each being a plane angle formed between a line that connects an outermost peripheral-side end of one of the at least two permanent magnets and an axial center of the rotator and a line that connects an outermost peripheral-side end of another of the at least two permanent magnets, and one of the plurality of rotator portions having the inter-magnet end angle is arranged on a downstream side of the ventilation path, which is larger than the inter-magnet end angle of another of the plurality of rotator portions arranged on an upstream side of the ventilation path, when the rotator comprises the plurality of permanent magnets:

each of the plurality of permanent magnets is arranged such that a perpendicular bisector of the permanent magnet passes through the axial center of the rotator;

the rotator includes a laminate of a plurality of rotator portions respectively having different inter-magnet end angles, each being a plane angle formed between a line that connects one outermost peripheral-side end of the permanent magnet and the axial center of the rotator and a line that connects the other outermost peripheral-side end of the permanent magnet and the axial center of the rotator, and one of the plurality of rotator portions having the inter-magnet end angle is arranged on a downstream side of the ventilation path, which is larger than the inter-magnet end angle of another of the plurality of rotator portions arranged on an upstream side of the ventilation path, when the rotator comprises the plurality of permanent magnet groups or the plurality of permanent magnets:

the plurality of rotator portions include two kinds of rotator portions corresponding to a large-angle rotator portion and a small-angle rotator portion having the inter-magnet end angle smaller than the inter-magnet end angle of the large-angle rotator portion, the two kinds of rotator portions being laminated in order of the small-angle rotator portion, the large-angle rotator portion, and the small-angle rotator portion along the axial line of the rotator; and when a value of the inter-magnet end angle at which a cogging torque becomes the smallest is θ, a value of the inter-magnet end angle of the small-angle rotator portion is smaller than θ and a value of the inter-magnet end angle of the large-angle rotator portion is larger than θ.

7. A rotating electric machine according to claim 6, wherein when the rotator comprises the plurality of permanent magnet groups, each of the plurality of permanent magnet groups is arranged in a V-like pattern and includes two permanent magnets.

8. A rotating electric machine according to claim 6, wherein when the rotator comprises the plurality of permanent magnet groups, each of the plurality of permanent magnet groups is arranged in a U-like pattern and includes three permanent magnets.

9. A rotating electric machine according to claim 6, wherein the rotator core includes magnet accommodating holes for accommodating the at least one permanent magnet therein, each of the magnet accommodating holes having gap portions on both sides of each of the at least one permanent magnet.

* * * * *